US005468273A

United States Patent [19]

Pevzner et al.

[11] Patent Number: 5,468,273

[45] Date of Patent: Nov. 21, 1995

[54] STRATAL POROUS FILTER MATERIAL

[75] Inventors: Lev K. Pevzner; Mikhail Y. Lakhovskiy; Boris S. Oborin, all of Yekaterinburg, Russian Federation

[73] Assignee: Intot, Ltd., Yekaterinburg, Russian Federation

[21] Appl. No.: 162,528

[22] Filed: Dec. 3, 1993

[30] Foreign Application Priority Data

Dec. 7, 1992 [RU] Russian Federation . 92010317020557

[51] Int. Cl.[6] .............................. B01D 39/00; C22C 1/04

[52] U.S. Cl. .............................. 55/523; 210/510.1

[58] Field of Search .............................. 95/273; 55/522, 55/523, 525; 210/510.1

[56] References Cited

U.S. PATENT DOCUMENTS

| | | | |
|---|---|---|---|
| 2,157,596 | 5/1939 | Davis | 55/523 |
| 2,220,641 | 11/1940 | Davis | 55/523 |
| 2,267,918 | 12/1941 | Hildabolt | 55/523 |
| 2,273,589 | 2/1942 | Olt | 210/510.1 |
| 2,450,339 | 9/1948 | Hensel | 210/510.1 |
| 2,455,804 | 12/1948 | Ransley et al. | 55/523 |
| 2,521,107 | 9/1950 | Wiley | 55/523 |
| 2,554,343 | 5/1951 | Pall | 55/523 |
| 2,689,178 | 9/1954 | Hignett | 210/510.1 |
| 3,581,902 | 6/1971 | Bidler | 210/510.1 |
| 4,186,100 | 1/1990 | Mott | 210/510.1 |

FOREIGN PATENT DOCUMENTS

| | | | |
|---|---|---|---|
| 56-149363 | 11/1981 | Japan | 55/523 |

OTHER PUBLICATIONS

Soviet Powder Metallurgy & Metal Ceramics (USA) vol. 18, No. 11, Nov. 1979 (Publ. Apr. 1980) "Bronze Filters for Air Purification in Automobiles".

*Primary Examiner*—Jay H. Woo
*Assistant Examiner*—Duane S. Smith
*Attorney, Agent, or Firm*—Ralph H. Dougherty; Scott E. Hane

[57] ABSTRACT

The stratal filter material includes a base layer made from highly porous honeycomb nickel-based material with pore sizes of 0.3 to 2.0 mm and a thickness selected from the ratio h:d=20 to 110, where:

h is the layer thickness, mm;

d is the porous nickel pore size, mm;

a working layer made from porous permeable material 0.35 to 2.5 mm thick, formed on the surface of base layer, and an intermediate layer of a combination of the base and working layer materials formed therebetween with a thickness of 0.3 d to 5 d.

5 Claims, 3 Drawing Sheets

STRATAL POROUS FILTER MATERIAL

FIELD OF THE INVENTION

The present invention relates to the field of powder metallurgy, in particular, to stratal porous filter materials, and more particularly to apparatus and methods for production of a filter.

BACKGROUND OF THE INVENTION

Filters for removing contaminants in compressed gas and air in pneumatic systems are usually of a multi-layer construction. One such filter is a material containing a base of steel with a hot hardness of at least 600 on the Rockwell C scale and a carbon content of no more than 0.5 weight percent, an intermediate layer of a metal of the iron group, preferably nickel or cobalt, and a hard alloy working layer with a thickness of 0.2 to 1.0 mm. However, this material is not porous and cannot be used for separating aerosol moisture and oil from the air or gas flow.

Porous moisture separators made from ceramics or porous materials are widely known in technological filtering processes. One such porous permeable material is made of bronze and is obtained by sintering powder of particle sizes ranging from 0.05 to 1 mm. The permeability of a material of this type is below 70 percent. The pores of such a material consist of the openings between spheres of particles that are sintered together, and these pores quickly become clogged with dirt when contaminated compressed air is passed through them.

Another filter known in the art is made of a highly porous honeycomb material based on metals, or ceramics, and is obtained by modeling a porous structure-forming matrix. The three-dimensional structure of such a material represents a three-dimensional honeycomb mesh with honeycomb sizes ranging from 0.4 to 2 mm and open porosity ranging from 75 to 95 percent. However, these materials do a poor job of separating aerosol moisture from the fluid flow.

Another filter material is comprised of a stratal porous permeable material from the class of combined porous permeable materials (CPPM). A two-layer filter material is known in the art and is made of a filter base of nickel (serge screen 80/270), onto which a working layer of porous nickel carbonyl powder is formed. The filtering properties of such two-layer CPPMs allows a filtration fineness of 3 to 5 μm. This degree of fineness is achieved due to design peculiarities of the two-layer material, obtained by spraying nickel carbonyl powder onto the nickel serge screen with subsequent sintering and cold rolling.

However, this stratal porous material does an inadequate job of separating small-size droplets of aerosol moisture from the compressed air or gas flow. This poor aerosol moisture filtering is due to a porosity of less than 70 percent, and moisture is held in the pores by adhesion forces and cannot be easily removed from the honeycomb structure of the porous material. The small contact zone of the capillary-porous powder layer prevents the fast removal of moisture from the fine porous layer, thereby sharply increasing the aerodynamic drag of the material.

OBJECTS OF THE INVENTION

The principal object of the invention is to provide an improved filtering method and apparatus which increases the quality of moisture removal by the filtering stratal porous material at its minimum aerodynamic drag.

SUMMARY OF THE INVENTION

The objective is achieved by construction of a stratal porous material comprising a nickel filter base and a porous working layer, with an intermediate layer formed therebetween.

The base is made of highly porous honeycomb nickel-based material having pore sizes of 0.3 to 2.0 mm. The thickness of the base porous nickel layer is dependent on the honeycomb size of the base material.

The working layer is made from porous permeable material obtained by sintering spherical bronze, nickel, or other corrosion-resistant powder with 40 to 70 percent porosity. The working layer should be 0.35 to 2.5 mm thick, and made of particles ranging in size from 0.05 to 1 mm in diameter.

A combination intermediate layer made of the same materials as the base and working layer is formed between the porous nickel base layer and the working layer of porous permeable material. The intermediate layer has a complex dendritespheroidal surface structure. The thickness of the intermediate layer is dependent on the honeycomb size d of the porous nickel base material and is generally from 0.3 d to 5 d. The purpose of this layer is to provide an adequately dense and uniform surface contact between the working layer and the porous nickel base.

BRIEF DESCRIPTION OF THE DRAWINGS

The foregoing and other objects will become more readily apparent by referring to the following detailed description and the appended drawings in which.

DETAILED DESCRIPTION OF THE INVENTION

Figure 1:
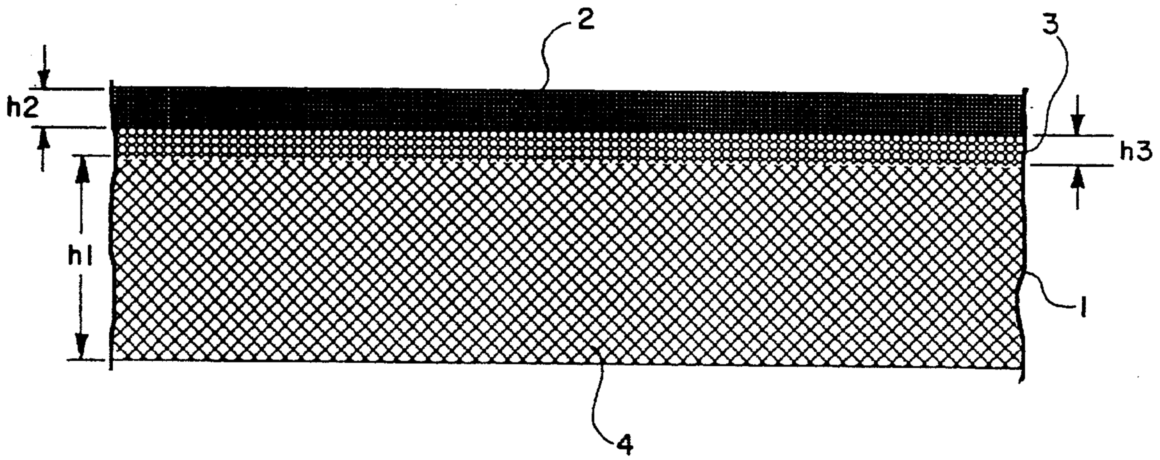
FIG. 1 is a cross-sectional view of the stratal filter material.
Figure 2:
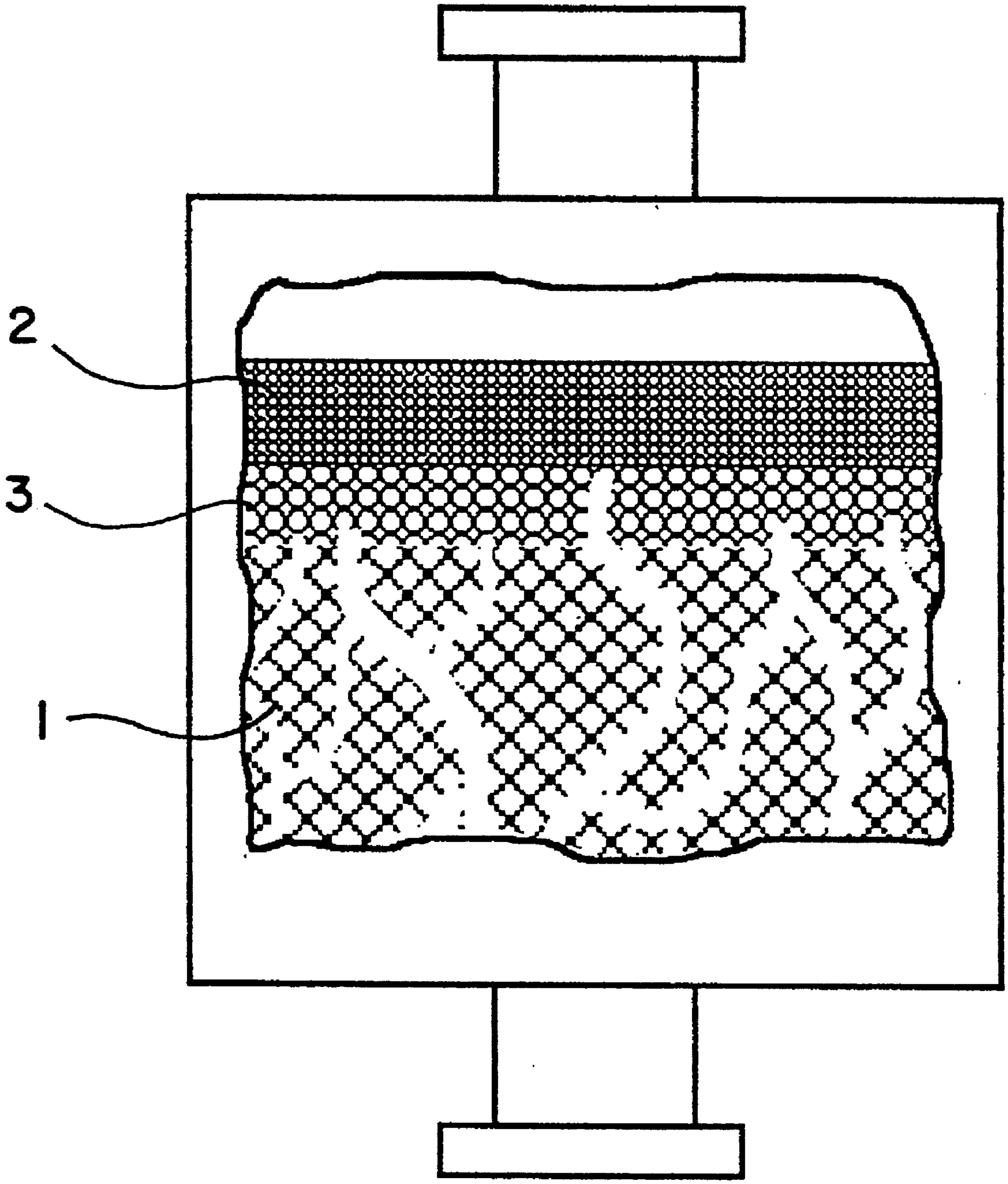
FIG. 2 is a partially cutaway isometric view illustrating a filter in accordance with the present invention.
Figure 3:
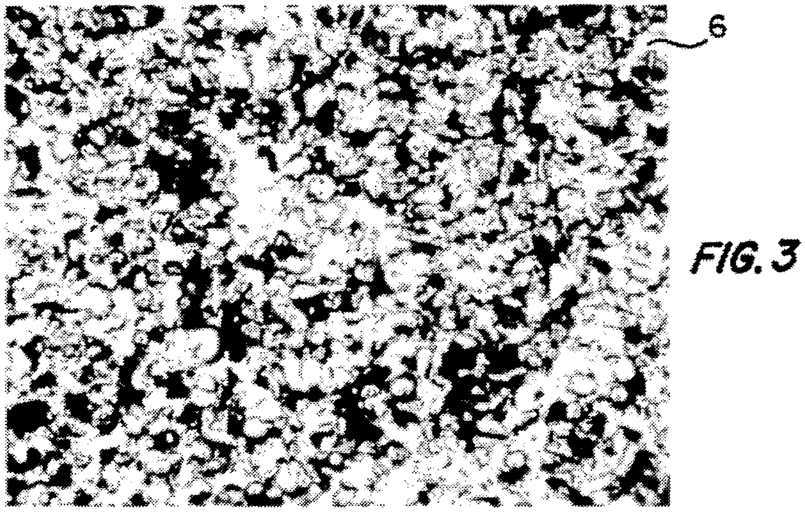
FIG. 3 is a 50×photomicrograph of the working layer.
Figure 4:
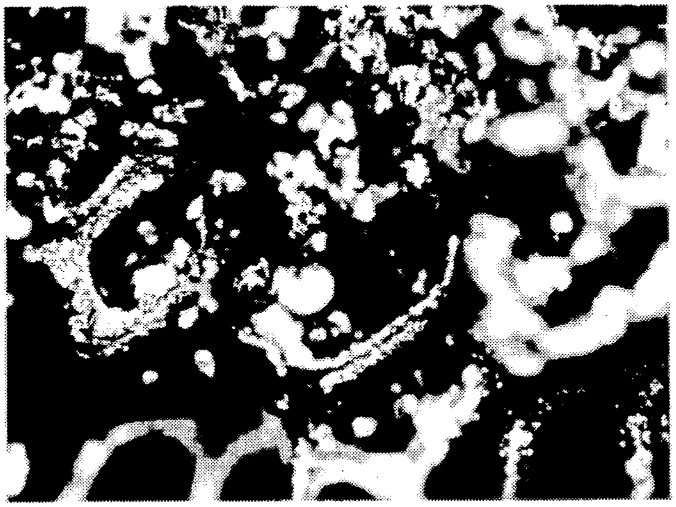
FIG. 4 is a 50×photomicrograph of the intermediate layer.
Figure 5:
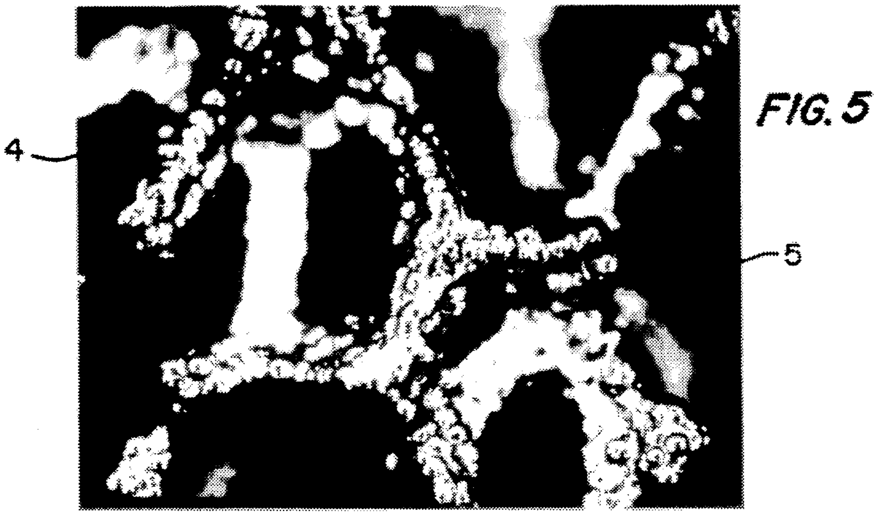
FIG. 5 is a 50×photomicrograph of the base layer.

Referring now to FIG. 1, the porous stratal filter material comprises a base layer 1 made of a highly porous honeycomb nickel-based material, a working layer 2 made of a porous permeable material formed from spherical powder material, and an intermediate layer 3 formed between the working layer 2 and the base 1.

The base layer 1 is made of highly porous honeycomb nickel-based material 4, hereinafter called porous nickel. of porous nickel material 4 for the base layer 1 is essential. Satisfactory moisture separation on corrosion-resistant materials is achieved with the use of materials containing large amounts of nickel, so the base material of the present invention will contain at least 50 percent nickel. The specific structure of the porous nickel surface critically affects the quality of moisture separation. The separated moisture quickly runs down over the labyrinths of this surface without clogging these labyrinths and without coming off the porous nickel surface.

The porous nickel base material 4 has pore sizes 5 of 0.3 to 2.0 mm. Pores smaller than 0.3 mm cannot be made, and pore sizes larger than 2.0 mm sharply reduce the efficiency of small droplet aerosol moisture separation as well as the rate of moisture removal from the working layer 2, causing an increase in aerodynamic drag.

The thickness of the porous nickel base layer h1 is dependent on the honeycomb size d of the base material 4. This thickness is defined by an h1:d ratio ranging from 20 to 110, where h1 is thickness, in millimeters, of the porous nickel base layer 1, and d is the honeycomb size, in millimeters, of the porous nickel base material 4. Experiments show that an h:d ratio less than 20 causes a secondary droplet carryover, and a ratio greater than 110 causes an unacceptable increase of aerodynamic drag and porous nickel consumption.

The working layer 2 is made from porous permeable material 6 obtained by sintering spherical bronze, nickel, or other corrosion-resistant powder with 40 to 70 percent porosity. Experiments show that the thickness of the working layer h2 should be 0.35 to 2.5 mm, and the layer should be made of particles ranging in size from 0.05 to 1 mm in diameter. At a layer thickness below 0.35 mm, aerosol droplets are not completely removed and at a layer thickness above 2.5 mm, aerodynamic drag increases sharply.

An intermediate layer 3 of the same materials as the base layer and working layer is formed between the base layer 1 and the working layer 2. The intermediate layer 3 has a complex dendrite-spheroidal surface structure. The thickness h3 of the intermediate layer 3 is dependent on the honeycomb size d of the porous nickel base material 4 and is generally from 0.3 d to 5 d. This intermediate layer 3 provides a dense and uniform surface contact between the working layer 2 and the porous nickel base layer 1.

When the thickness h3 of the intermediate layer is less than 0.3 d, the layer does not provide the 70 to 90 percent surface contact between the base and working layers. This lack of surface contact prevents the complete removal of moisture from the working layer. When the thickness h3 of the intermediate layer is greater than 5 d, the aerodynamic drag is sharply increased.

Functionally, each of the layers has its own purpose. A qualitative separation of small droplet aerosol moisture takes place in the working layer 2. However, due to characteristics of the pore structure and pore sizes ranging from 0.002 to 0.05 mm, moisture is held in the pores by adhesion forces gradually filling the pores. Concurrently, aerodynamic drag of the filtering material increases and its permeability decreases. When pressure is increased, separated moisture is pressed through the filtering material, and secondary droplet carryover is originated. In spite of its well-developed surface, the porous nickel base layer 1 insufficiently separates the small aerosol droplets. The porous nickel base layer 1 adequately draws off moisture accumulating in it due to contact with the working layer 2 made of the porous material and a capillary effect. In the porous nickel base layer, moisture easily flows down over the surface labyrinths without creating additional drag to the flow of air or gas being cleaned, due to the large porosity of the porous nickel honeycomb structure.

The technological process to produce the inventive filter material conforms to standard processes of powder metallurgy.

Tests show that the invented stratal porous filter material allows removal of up to 98 percent of aerosol moisture and oil at pressure losses not more than 0.3 atm.

What is claimed is:

1. A stratal porous filter material, comprising:
   - a base layer, said base layer being made of a highly porous honeycomb nickel-based material having pores sized between 0.3 to 2.0 mm;
   - said base layer having a thickness based on a 20 to 110 ratio of h:d, d being the size of pores and h being the thickness of the base layer;
   - a working layer formed on the surface of said base layer, said working layer made of 0.35 to 2.50 mm thick porous spherical powder material;
   - an intermediate layer formed between said base layer and said working layer, said intermediate layer comprising a combination of said nickel-based and said porous spherical powder materials having a thickness of 0.3 to 5.0 d.

2. The stratal porous filter material of claim 1, wherein said nickel-based material contains from 50 to 100 weight percent nickel.

3. The stratal porous filter material of claim 1, wherein said porous spherical powder material comprises bronze spherical powder.

4. A stratal porous filter material, comprising:
   - a base layer, said base layer being made of a highly porous honeycomb nickel-based material containing 50 to 100 weight percent nickel;
   - a working layer formed on the surface of said base layer, said working layer made of a porous permeable bronze spherical powder material;
   - an intermediate layer formed between said base layer and said working layer, said intermediate layer comprising a combination of said nickel-based and said porous permeable materials;
   - said nickel-based material having pore sizes of 0.3 to 2.0 millimeters;
   - said base layer having a thickness determined according to the equation h:d=20 to 110, where
     - h is the layer thickness in millimeters, and
     - d is the pore size in millimeters of said nickel-based material;
   - said working layer having a thickness of 0.35 to 2.5 millimeters;
   - said intermediate layer having a thickness of 0.3 d to 5 d, where d is the pore size in millimeters of said nickel-based material.

5. A filter for removing contaminants from gases flowing therethrough, comprising:
   - a housing, having an inlet port and an outlet port;
   - said housing containing therein a stratal porous filter material, said stratal porous filter material comprising:
     - a base layer, said base layer being made of a highly porous honeycomb nickel-based material comprising 50 to 100 weight percent nickel;
     - a working layer formed on the surface of said base layer, said working layer made of a porous permeable material;
     - an intermediate layer formed between said base layer and said working layer, said intermediate layer comprising a combination of said nickel-based and said porous permeable materials;
     - said nickel-based material having pore sizes of 0.3 to 2.0 millimeters.

* * * * *